US008579002B2

(12) United States Patent
Nyberg et al.

(10) Patent No.: US 8,579,002 B2
(45) Date of Patent: Nov. 12, 2013

(54) DEVICE FOR MANUFACTURE OF AN ORIENTED STRAND BOARD BEAM

(75) Inventors: Alexander Nyberg, Stockholm (SE); Per Nylund, Åkersberga (SE)

(73) Assignee: Newbeam Sweden AB (SE)

( * ) Notice: Subject to any disclaimer, the term of this patent is extended or adjusted under 35 U.S.C. 154(b) by 272 days.

(21) Appl. No.: 12/991,091

(22) PCT Filed: Apr. 27, 2009

(86) PCT No.: PCT/EP2009/055063
§ 371 (c)(1),
(2), (4) Date: Jan. 31, 2011

(87) PCT Pub. No.: WO2009/138320
PCT Pub. Date: Nov. 19, 2009

(65) Prior Publication Data

US 2011/0146890 A1 Jun. 23, 2011

(30) Foreign Application Priority Data

May 16, 2008 (SE) ....................................... 0801127

(51) Int. Cl.
*B32B 21/02* (2006.01)
*B27N 3/14* (2006.01)
*B27N 5/00* (2006.01)

(52) U.S. Cl.
USPC ........... 156/581; 156/62.2; 425/258; 425/447

(58) Field of Classification Search
USPC ................ 156/62.2, 62.4, 581; 425/112, 258, 425/447–449
See application file for complete search history.

(56) References Cited

U.S. PATENT DOCUMENTS 3,473,204 A * 10/1969 Ianuzzi et al. ................ 425/449
4,494,919 A * 1/1985 Knudson et al. ............. 425/83.1

(Continued)

FOREIGN PATENT DOCUMENTS

GB 1224823 A 3/1971
JP 2002-046115 A * 2/2002

(Continued)

OTHER PUBLICATIONS

"International Application Serial No. PCT/EP2009/055063, International Preliminary Report on Patentability mailed Apr. 29, 2010", 25 pgs.

(Continued)

*Primary Examiner* — Michael Tolin
(74) *Attorney, Agent, or Firm* — Schwegman Lundberg & Woessner, P.A.

(57) ABSTRACT

The invention relates to a device for manufacturing an OSB beam with a web and at least one flange. The starting material for the beam is wood strands of OSB type. The device comprises a feeder device for advancing the strands, a metering device for metering out the strands, a nozzle, through which the metered strands pass, and a receiving surface for receiving the strands. The feeder device, the metering device and the nozzle are adapted for applying strands to the receiving surface in the form of an elongated bead. The height of the bead is at every point of the cross-section substantially adapted to the web and flange of the beam being made. The invention also relates to a process for manufacturing an OSB beam and to a computer readable medium comprising a program.

7 Claims, 5 Drawing Sheets

(56) References Cited

U.S. PATENT DOCUMENTS

| | | | | |
|---|---|---|---|---|
| 4,706,799 | A | 11/1987 | Churchland et al. | |
| 6,895,723 | B2 * | 5/2005 | Knokey et al. | 52/841 |
| 2004/0040625 | A1 | 3/2004 | Knokey et al. | |
| 2004/0043095 | A1 * | 3/2004 | Graf et al. | 425/371 |
| 2006/0108044 | A1 * | 5/2006 | Matsumoto et al. | 156/60 |

FOREIGN PATENT DOCUMENTS

| | | | |
|---|---|---|---|
| SE | 514962 | C3 | 5/2001 |
| WO | WO-91/12944 | A1 | 9/1991 |
| WO | WO-92/01541 | A1 | 2/1992 |
| WO | WO 01/21369 | A1 * | 3/2001 |

OTHER PUBLICATIONS

"International Application Serial No. PCT/EP2009/055063, International Search Report mailed Sep. 17, 2009", 4 pgs.

"International Application SerialNo. PCT/EP2009/055063, Written Opinion mailed Sep. 17, 2009", 8 pgs.

"Swedish Application SerialNo. 08011272, Office Action dated Nov. 11, 2008", 4 pgs.

* cited by examiner

DEVICE FOR MANUFACTURE OF AN ORIENTED STRAND BOARD BEAM

RELATED APPLICATION

This application is a nationalization under 35 U.S.C. 371 of PCT/EP2009/055063, filed Apr. 27, 2009 and published as WO 2009/138320 A1 on Nov. 19, 2009, which claimed priority under 35 U.S.C. 119 to Sweden Patent Application No. 0801127-2, filed May 16, 2008; which applications and publication are incorporated herein by reference in their entirety.

TECHNICAL FIELD

The invention relates to the manufacture of streams from wood composite material of Oriented Strand Board (OSB type).

BACKGROUND

It is known from SE 514962 that a mixture of wood splinter/chips and glue to press beams of various cross-sections and thin material thicknesses. The advantages of such beams are numerous. Inter alia, such beams have high strength at the same time as the cross-section is narrow, whish means that the weight and the material use will be low. Furthermore, the raw material is inexpensive due to the fact that the manufacture is based on the known and successful wood composite material OSB (Oriented Strand Board), which is a type of chipboard which can be made from relatively inexpensive raw wood material. Further-more, the beams can be made with many different cross-sections, for example cross-sections which are normally to be found in steel beams such as angle profiles, U-profiles, I-profiles and H-profiles. During manufacture very high compression pressures are used, normally around 5 000 bar.

One problem with the manufacture of a beam of OSB, is to distribute the strands in a suitable manner in the press. The strands tend to hook into each other or ball up. A good distribution of the strands, both in the longitudinal and the transverse direction of the press mall, is necessary to produce a good quality beam.

SUMMARY OF THE INVENTION

The purpose of the present invention is to provide a device and a process for manufacturing an OSB beam. The manufacture is to be automated and provide beams of uniform quality along the length and width of the beams. This purpose has been achieved by a device for manufacturing an OSB beam with a web and at least one flange. The starting material for the beam is wood strip of OSB type. The device comprises a feeder device for advancing the strands, a metering device for dispensing the strands, a nozzle through which the dispensed strands pass and a receiving surface for receiving the strands. The feeder device, the metering device and the nozzle are adapted for applying strands to the receiving surface in the form of an elongated deposit or bead. The height of the bead is in each point in its cross section substantially adapted to the web and flange of the beam being made. Finally, the device comprises, for the manufacture of an OSB beam, a press device which is adapted to compress the strands into a beam.

Always the beams can thereby be manufactured in an automatic manner. By virtue of the fact that the cross-section of the bead is adapted to the shape of the beam it is assured that the amount of strands required for the various portions of the beam are supplied to the press. This produces a beam of uniform quality across its width. A uniform quality along the length of the beam is assured by the feeder device and the dispensing device.

The strands are covered with resin binder preferably before they are brought to the feeder. This is done in a blender where the strands are tumbled to provide an even covering of resin binder.

The strands can be arranged in a long bead by the movement of the receiving surface and the fact that the nozzle is stationary. Alternatively, the nozzle can move and the receiving surface be stationary. In the present embodiment, a movable nozzle would also mean that the feeder and the metering device will be movable. An advantage with a movable receiving surface is that it can move reciprocally between two presses, with the nozzle placed between the presses.

The device for manufacture of an OSB beam can comprise a plurality of nozzles through which doses of strand pass during the distribution process. This makes it possible to achieve a bead with a predetermined cross-section. For example, a first nozzle can apply a central strand bead on the receiving surface, and the second nozzle can apply additional strands at one side of the first bead. A composite bead of such cross-section is suitable for producing an L-beam.

Alternatively, a bead with a predetermined cross-section can be achieved by controlling the relative movement between the nozzle and the receiving surface. For example, the receiving surface can pass under the nozzle several times and with varying speed, with the strands being applied to the receiving surface. In this manner as well, or in combination with the previously mentioned method using a plurality of nozzles, the cross-section of the bead can be tailored.

The receiving surface can have the same length as the press. In this manner, a strand bead can be applied to the receiving surface, and the bead can then be moved to the press, retaining its shape.

The receiving surface can also be provided with doors, which can be opened so quickly that the strand bead on the receiving surface falls down into the press retaining the essential cross-section of the bead. When the doors are opened with sufficient speed, the bead will retain its cross-section. Slowly opening doors can, due to friction for example, affect the cross-section of the bead, and this has been demonstrated in experiments.

A minimal drop is desirable when transferring the strand bead from the receiving surface to the press, in order to preserve the cross-section of the bead as much as possible during the drop to the press. This can be achieved by constructing the doors to open by a lateral movement. If the doors where instead to be opened by a rotary movement, i.e. with the doors swung on hinges, this would require a greater space for the doors between the receiving surface and the press.

The feeder and the distributor are intended to feed out strands at an even tempo. Correct feed out rate of strands can be sure to a greater degree by arranging a scale in the distributor.

Adjustable deflection baffles can be arranged in the distributor. These deflection baffles are intended to preserve an even flow of the strands. Particularly when a scale is used in the distributor, the deflection baffles can effectively break up lumps of strands. The deflection baffles also centre the strands towards the centre of the distributor, so that the cross-section of the strand bead can be defined more exactly. Finally, the deflection baffles can vary the speed of the falling strands, reducing the risk that the strands would be misplaced on the receiving surface, or affect a previously laid-down strand bead in an undesirable manner. By virtue of the fact that the deflection baffles are adjustable, their angle can be optimized for prevailing conditions regarding for example the amount of strands per unit of time.

The feeder can be made with a strand magazine and a piston which pushes the strands forward towards a mouth of the magazine. An even strand flow can thus be achieved simply without having to modify or demolish the individual strands.

For the purpose of achieving an even bead of strands in the feeder it can be provided with a break up device. This avoids feeding strands in unpredictable amounts creating so-called domes.

The break up device can be arranged at the opening of the strand magazine. In this manner any lumps of strand which may have been formed in the feeder are broken up before they leave the feeder.

An even flow of strands from the feeder can be achieved by providing the break up device with a pulsating impact means, which strike from below the strands, which with the aid of the plunger have been pressed out of the magazine. This impact means effectively breaks up the lumps of strands which may have been formed in the feeder. Alternatively, the break up means can comprise a vibrator which shakes the magazine separating strands which stuck to each other.

The purpose has also been achieved by a process for manufacturing an OSB beam. The process comprises the steps of advancing strands with a feeder, metering the strands with a metering device, feeding out the strands through a nozzle unto a receiving surface. The advancing, the metering and the feeding out are carried out in such a manner that an elongated bead is produced on the receiving surface. The height of the strand bead is adapted at each point of the cross-section to the web and flange of the beam being made. The strand is then transferred to a press where it is compressed into a beam.

The purpose is finally achieved by a computer readable medium comprising a program. When the program is run in the processor of a control means, it enables a device for manufacturing an OSB beam to feed out strands by controlling a feeder device, metering strands by controlling a metering device, and feeding out strands onto a receiving surface through a nozzle. The feeder and the metering device are in this case controlled so that the strands are applied on the receiving surface in an elongated bead. The strand bead is transferred to a press and is compressed into a beam by activating the press. The control is carried out so that the strand bead applied to the receiving surface has a cross-section the height at each point of which is substantially adapted to the web and flange respectively of the compressed beam.

DESCRIPTION OF THE FIGURES

The invention will be described in more detail below with reference to a number of figures. The figures show in.

The figures are only intended to exemplify conceivable embodiments of the invention. The same applies to the following detailed description of the embodiments. The scope of protection of the invention should not be limited by the figures or the description of the embodiments but is defined by the patent claims.

DESCRIPTION OF EMBODIMENTS

Figure 1:
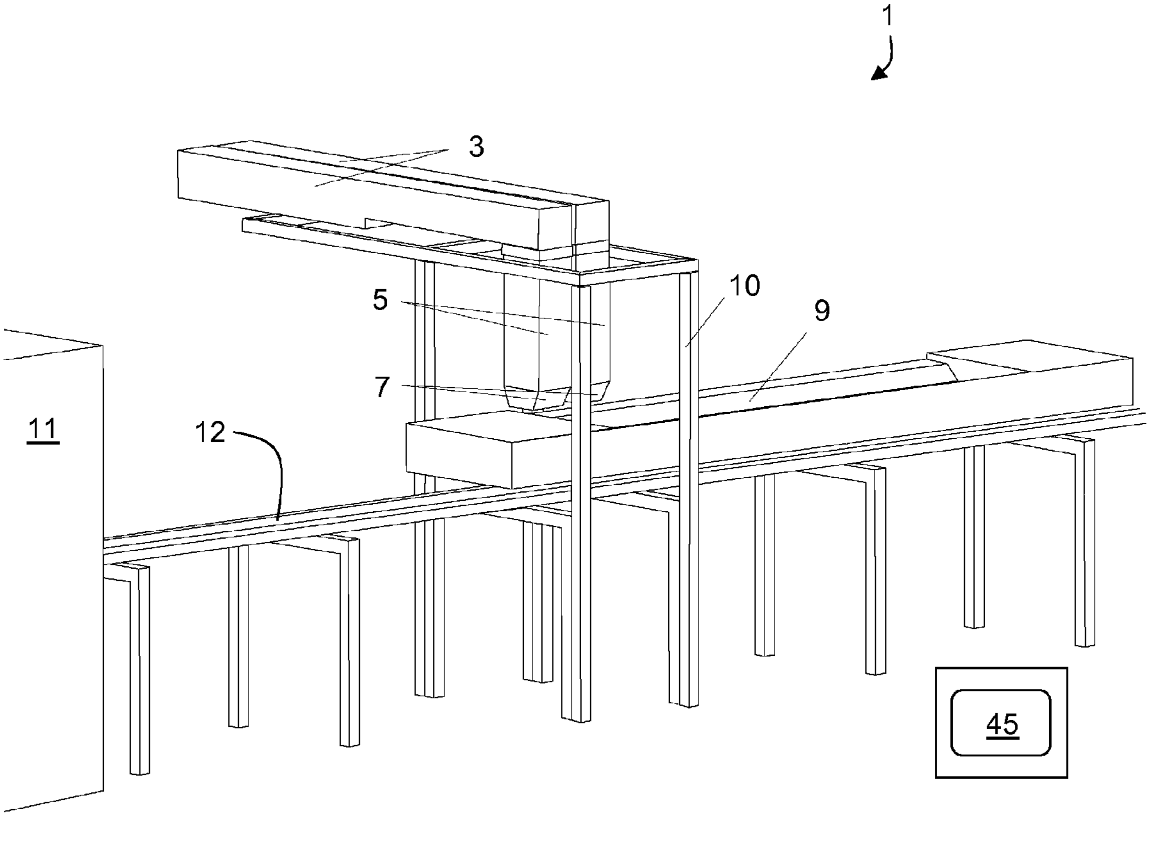
FIG. 1 a perspective view of a device according to the invention.

FIG. 1 shows in perspective an example of a device 1 for manufacturing an OSB beam. An OSB beam refers to a beam, joist or stud which consist of compressed wood strands or chips of OSB type, in this application referred to as "strands".

The OSB strands used for manufacturing of the beam are commonly 40-200 mm long, 10-30 mm wide and have a thickness of 0.7-2 mm. These relatively long chips, compared to chips used in conventional chip board, provide long unbroken fibre chains in the beams. This gives high shear and bending strength. The relatively thin thickness means that there is place for a number of fibre layers even in the sections of minimal thickness. This provides even strength in the beams. Particularly good characteristics are achieved with strands having a length of 60-120 mm, a width of 10-20 mm and a thickness in the interval 1-1.5 mm.

Essentially all types of wood are conceivable as starting material. For a number of reasons, however, the aspen is a tree which is particularly well suited for OSB beams. In the first place, aspen is relatively inexpensive, due to the great supply, and since it has a low lignin content, the aspen is not suitable for making pellets. Demand from energy producers would otherwise have driven up the price. Additional advantages of aspen are the fact that the even growth during the year results in smooth growth rings and thus relatively little inner tension. The strands will thus not curl up during drying, which means that the fibres of the strands can be arranged in the desired manner in the longitudinal and transverse directions of the beams. The material also has a low resilience. Finally the low resin content of aspen strands means that it will absorb the resin binder which is added before the strands are pressed together.

FIG. 1 shows a pair of feeder devices 3 containing a relatively large amount of strands. From one end of the feeders 3, the strands fall down through the metering devices 5 and the nozzles 7 to a receiving surface 9. All of the devices are carried by a frame 10. The number of feeders 3 can be varied by arranging the desired number side by side. The same applies to the metering devices 5 and the nozzles 7. Furthermore, it is possible to allow different numbers of respective devices 3, 5, and 7. For example, one feeder 3 can supply a number of metering devices 5 with strands. The converse is also possible: that a number of feeders 3 can deliver strands to a single metering device 5. The metering devices 5 can distribute the strands to the receiving surface 9 through a number of separate nozzles 7. In this manner, the device 1 can be modified and adapted to current requirements.

FIG. 1 shows as well a press 11. The receiving surface 9 is movable on a rail 12, which is supported by the frame 10. The rail 11 extends under the nozzle 7 and into the press 11. After strands have been applied to the receiving surface 9, it is transported into the press 11 where the strands are compressed into a beam, as described in SE 514962.

The receiving surface 9 is provided thereunder with doors (not shown) which can be opened. The bead of strands which has been applied to the receiving surface 9 can thus be dropped down into the press 11. In order to retain the cross-section of the strand bead, for reasons described below, it is advantageous to minimize the effect on the strand bead. This is achieved firstly by making the doors so that they can be opened quickly, so that the strand bead is not affected by friction from the doors when opened. Secondly, the affect of the doors is minimized by making them as sliding doors, which are opened horizontally, thereby making it possible to minimize the drop from the receiving surface 9 to the press.

Stating that the doors can be opened "rapidly" means that the opening movement is performed at such a speed that inertia essentially preserves the cross-sectional shape of the strand bead during opening. How rapidly the doors need to be opened depends on the design, both as regards dimension and coefficients of friction, as well as the type of strand. One example of a suitable opening speed is approximately 0.5 m/s.

It is also possible to arrange an additional press at the opposite end of the rail 12. The receiving surface 9 can then move back and forth between the two presses, into which the receiving surface 9 will leave strand beads which have been applied by the nozzles 7.

The receiving surface 9 is represented here as a carriage which can slide on the rail 12. Drive means (not shown) are arranged to move the receiving surface 9 and to open the doors. A number of other embodiments of the receiving surface 9 are conceivable however. For example, the receiving surface 9 can be made as a carriage rolling on wheels or as a conveyor belt. The receiving surface 9 has suitably the same length as the press or presses 11, so that the strand bead can retain its shape when it is transferred to the press or presses.

Figure 2:
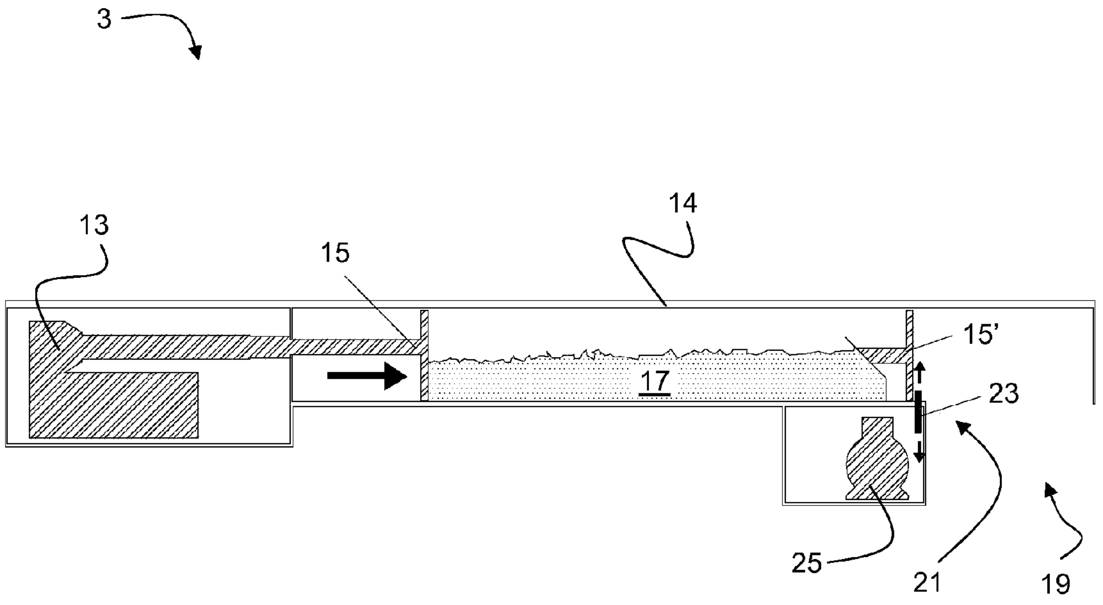
FIG. 2 a side view of a feeder device with a feeder plunger and strands advanced by the plunger, FIG. 3 a side view of the feeder device in FIG. 2, and a metering device arranged thereafter, FIG. 4 a frontal view of a plurality of feeder devices, metering devices and nozzles arranged next to each other, FIG. 5*a* a cross-section through a strand bead which is adapted to a U-beam, and a corresponding beam, and FIG. 5*b* a cross-section corresponding to that in FIG. 5*a*, but now for an L-beam.

FIG. 2 shows a side view of a feeder 3 with an advancing device 13, a magazine 14 and a plunger 15. The plunger 15 is driven by the advancing means 13 axially through the magazine 14, which is illustrated by the horizontal arrow in FIG. 2. In the figure the plunger 15 is shown in the position where forward feed has just been initiated and in the final position 15'. The magazine 14 can have a rectangular cross-section with an upper wall, a lower wall and side walls. The plunger 15 then has a rectangular shape which is adapted to the cross-section of the magazine 14, so that the plunger 15 in its movement through the magazine 14 pushes in front of it any strands 17 in the magazine. The strand 17 can for example be filled into the magazine through a door (not shown) in the top of the magazine.

The plunger 15 pushes the strands 17 through the magazine 14 towards an opening 19 in the end of the magazine. As a result of the compression of the strands which thus occurs, the strands 17 tend to entangle themselves or lump together through engagement of the individual strands. When the strands are pushed over the edge 21 of the magazine 14 at the opening 19, these lumps can result in an overhang of strands 17. The lumping will thus cause arching A breaker device 23 is supplied for the purpose of breaking these arches and thus providing an even flow of strands 17 from the feeder 3.

The breaker device 23 in this case consists of a pulsing impact means 23. The impact means 23 can be made as a plate which hits from below the strands 17 which are fed out over the edge 21 of the magazine 14. A driving means 25 is coupled to the impact means 23 and drives it intermittently in an up-and-down movement, as illustrated by the vertical arrows in FIG. 2. The impact means 23 can extend up through the entire width of the magazine 14 for the purpose of acting on the entire amount of strands 17 which are fed by the plunger 15 out over the edge 21.

The movement of the impact means 23 can be varied both as regards amplitude and frequency. Furthermore, the position of the impact means 23 can be adjusted up and down relative to the lower wall of the magazine 14.

Figure 3:
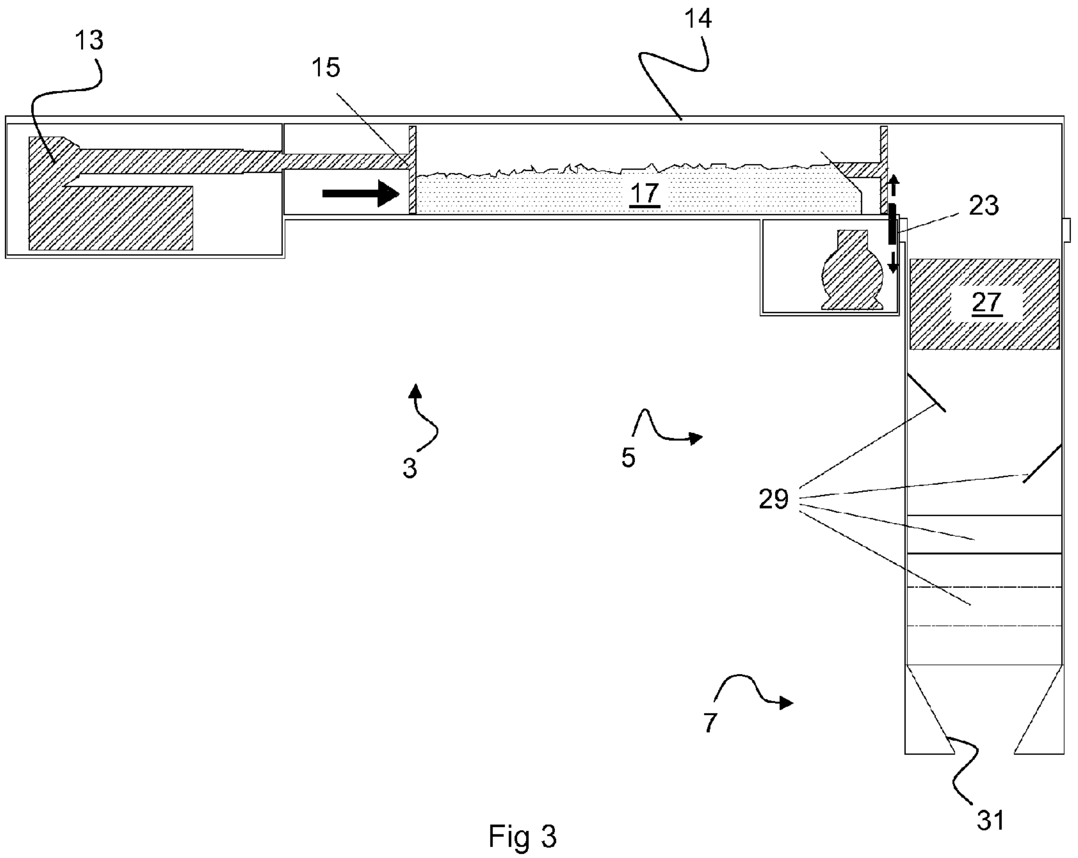

FIG. 3 shows a side view of the above described feeder 3 with a metering device 5 and nozzle 7 connected thereto. As can be seen in the figure, the metering device 5 is arranged under the opening 19 of the feeder 3 and the nozzle 7 is in turn placed under the metering device 5. The strands 17 fall from the feeder 3 through the metering device 5 and finally through the nozzle 7.

In the upper portion of the metering device 5 there is a scale 27. In the scale 27 strands 17 are collected, as they are continuously fed out of the feeder 3. When the mass of strands in the scale 27 reaches a predetermined weight, this mass of strands is released from the scale 27 so that the strands will fall down through the metering device.

The scale 27 can for example comprise a paddle wheel with a number of buckets. The paddle wheel rotates and the buckets are filled and emptied sequentially. The wheel is suspended so that the scale 27 can monitor the weight and thus the weight of the strands. The rotation of the bucket wheel is controlled by the weight of the strands in the respective bucket. The bucket wheel rotates so that an empty bucket is turned upward and begins to collect strands from the feeder 3 as soon as the preceding bucket has been determined by the scale to contain a predetermined amount of strands. At the same time as an empty bucket has been turned upwards, a corresponding filled bucket is turned downward and a load of strands is released from the bucket. In this manner metering of the correct amount of strands per unit of time is assured.

As can be seen in FIG. 3 the metering device 5 also comprises a number of deflecting plates or baffles 29. The metering device 5 has a rectangular cross-section with four side walls, from which the deflecting baffles 29 extend. In the figure, there are at the top two deflecting baffles 29 which extend from the left hand and right hand walls respectively of the metering device 5. Below these two deflecting baffles, there are two additional baffles 29 which extend from the forward and rearward respectively (from the viewer's perspective) of the metering device 5. Thus all of the walls of the metering device 5 are provided with deflecting baffles 29. As circumstances dictate more or fewer deflecting baffles can be used.

The angle of the deflecting baffles 29 is adjustable relative to the wall of the metering device 5. Thus the deflecting baffles 29 can be locked at various angles relative to the amount of strands 17 which fall through the metering device 5. For example, the deflecting baffles 29 can be set so that the strands are retarded and fall down on the receiving surface 9 at a relatively low speed. The speed can thus be adapted so that the strands will not bounce against the receiving surface 9 and end up in an undesirable location. Furthermore, reduced speed prevents the strand 17 at impact from changing the shape of a strand bead already on the receiving surface.

Figure 4:
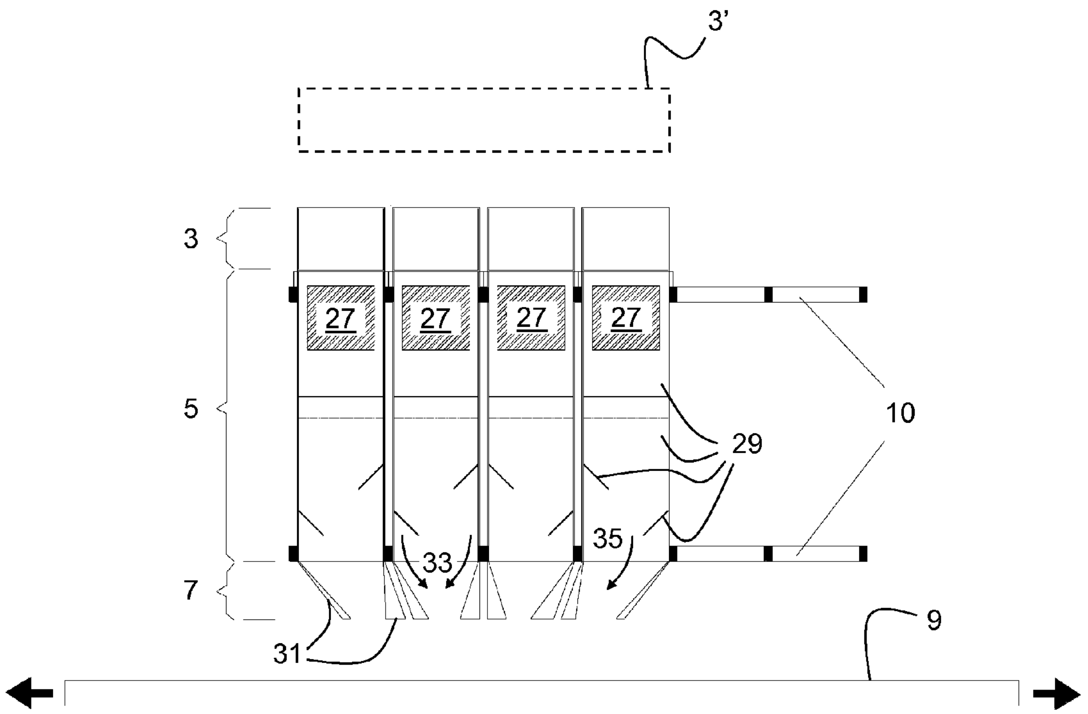

FIG. 4 shows a front view of a plurality of devices 3, 5, 7 corresponding to the set shown in FIG. 3. A plurality, here four, feeders 3 are arranged side by side in a frame 10. As can be seen in the figure, the frame has a number of sections, here six, where a feeder 3, a metering device 5 and a nozzle 7 can be placed. The number of sets can thus be varied as desired.

Through minor redesigning, a single large feeder device 3' can for example supply strands to a number of metering devices 5 and nozzles 7. With reference to FIG. 4, such a device could be realized by replacing the plurality of individual feeders 3 with a large feeder 3', the width of which corresponds to sum of the widths of the replaced feeders 3.

It can be seen in FIGS. 3 and 4 that each nozzle 7 comprises steering surfaces 31. The steering surfaces 31 are intended to control and steer the fall of the strands 17 on to the receiving surface 9. With the aid of the steering surfaces 31, the strands can be centered towards the middle of the nozzle, as illustrated by the arrows 33 in the second nozzle from the left in FIG. 4, or the amount of strands can be directed laterally, as illustrated by the arrow 35 in the forth nozzle. The steering surfaces 31 can be arranged around the entire nozzle 7, so that the flow of strands can be directed in any direction. This makes it possible to achieve a strand bead of the desired cross-section. The cross-section of the nozzle 7 can for example be rectangular or circular. The number of openings and the placement of the openings can vary between different nozzles.

It is particularly evident from FIG. 1 that the nozzles 7 have been placed here side by side over the centre of the receiving surface 9. The steering surfaces 31 can in this case see to it that the strand bead receive the desired cross-section (see FIG. 5). It is also possible to place the nozzles 7 at different distances above the receiving surface.

Figure 5A:
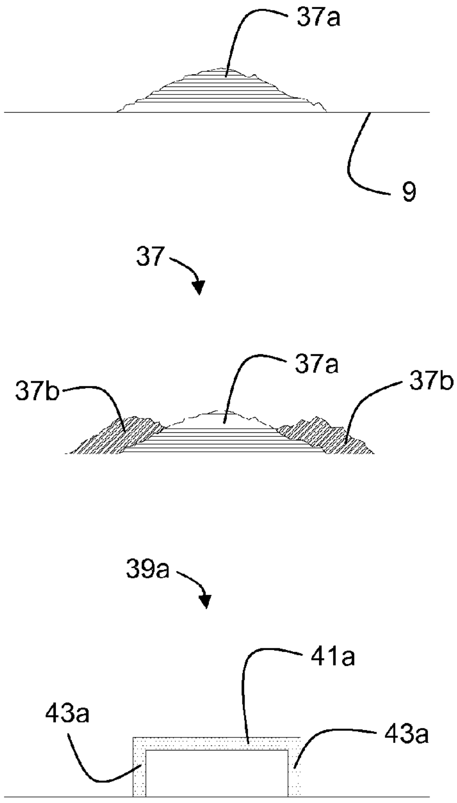
Figure 5B:
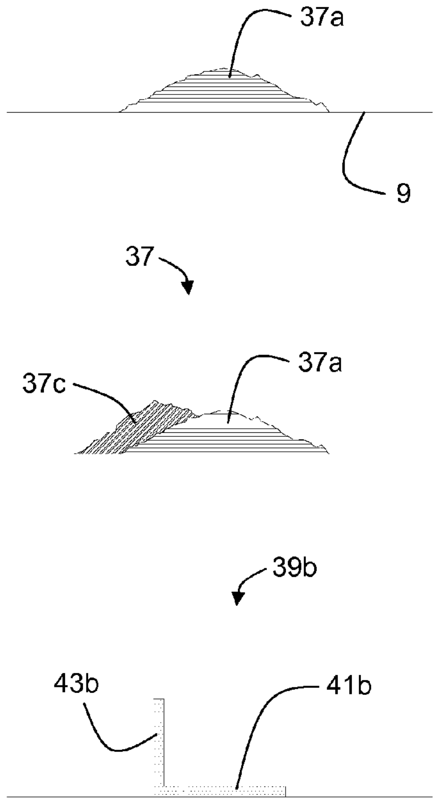

FIGS. 5*a* and 5*b* show the cross-section through the receiving surface 9 and the strand beads 37 deposited thereon. At the bottom are also illustrated the finished beams, where FIG. 5*a* shows a U-beam 39*a* and FIG. 5*b* shows an L-beam 39*b*. The FIGS. 5*a* and 5*b* illustrate how the cross-section of the strand bead 37 is adapted to the profile of the beam 39*a*, 39*b*, which is made therefrom. The strand beads 37 consist in this example of a centre bead 37*a* and one or more side beads 37*b*, 37*c*. The invention makes it possible to provide a strand bead 37 of the desired cross-section, adapted to the profile of the beam. The strand bead 37 can be made up of a desired number of partial strand beads 371, 37*b*, 37*c*.

When manufacturing a U-beam 39*a*, a first nozzle 7 can apply a centre bead 37*a*, which, after pressing, can constitute the web 41*a* of the beam 39*a*. A second or a third nozzle 7 can apply side beads 37*b*, which will be the flanges 43*a* of the beam. An L-beam can be made from a centre bead 37*a* which will supply material for the web 41*b* of the beam 39*b*, and a side bead 37*c* supply material for the flange 43*b* of the beam 39*b*. The strand bead 37 can in this manner be tailored to the web 41 and flange/flanges 43 of the beam 39.

The strand beads 37 are produced in this case by the receiving surface 9 moving relative to the nozzle or nozzles 7. The motion of the receiving surface, which is illustrated by the horizontal arrows in FIG. 4, are adapted to the feed out of strands.

The above described scale 27 feeds out intermittently predetermined amounts or batches of strands 17. The movement of the receiving surface 9 must then be adapted thereto and be moved intermittently. After one load of strands has left the scale 27 and fallen down onto the receiving surface 9, the receiving surface 9 thus moves intermittentally forward and the next load is supplied. In this manner an even strand bead 37 is applied in the longitudinal direction. The movement can be adapted to the drop amount from the various metering devices and vice versa.

The device for producing an OSB beam can also be realized without the wale 27. This presupposes a very even flow of strands from the feeder 3. In such an embodiment, the receiving surface 9 is instead move continuously at a speed which is adapted to the application of strands on the receiving surface 9.

The various partial strand beads 37*a*, 27*b*, 27*c* which together make up the strand bead 37, can be applied on the receiving surface 9 substantially simultaneously by a number of nozzles 7 arranged next to each other. Alternatively, the receiving surface 9 can pass by a nozzle 7 a number of times. At a first passage, a centre bead 37*a* can be applied for example and at the second passage, a side bead 37*b*, 37*c* can be applied. To build up complex bead profiles, these procedures can be combined, i.e. application can occur through a number of nozzles 7 at the same time as the receiving surface 9 is moved appropriately under the nozzles 7.

The receiving surface 9 has been described above as being movable. It is essential for the functioning of this invention that the receiving surface 9 be movable relative to the nozzle 7. It is, in other words, possible to allow the nozzle 7 to move while the receiving surface 9 is stationary. This method can also produce a strand bead 37 with the desired cross-section.

The present device for manufacturing an OSB beam comprises a control means with a processor 45, which is illustrated schematically in FIG. 1. The control device is connected to and controls all other moving parts of the device for manufacturing an OSB beam. The control device can for example be programmed to control the advancement of the plunger 15, so that the advancement is interrupted when the scale 27 signals that the relevant bucket contains the predetermined amount of strands. Furthermore, the control device can control the receiving surface 9 according to one of the methods described above, so that an even strand bead 37 of predetermined cross-section is achieved. The press 11 can be controlled by its own control (not shown). The control means of the press 11 then communicates with the above mentioned processor 45, so that the press 11 can be activated after a strand bead 37 has been left in the press and the receiving surface 9 has been moved out of the press 11.

The invention claimed is:

1. A device for manufacturing an oriented strand board beam with a web and a flange, said device comprising:
  - a feeder device for advancing strands, the feeder device comprising a strand magazine and a plunger which pushes strands in the strand magazine in a direction towards an opening of the magazine,
  - a metering device for metering out said strands,
  - a nozzle through which metered strands pass,
  - a receiving surface for receiving said strand,
  - said feeder device, metering device and nozzle being adapted for application of strands on the receiving surface in an elongated bead, and
  - a press which is adapted to compress the strands into a beam,
  - the strand bead applied to the receiving surface having a cross-section the height of which at each point is substantially adapted to the web and flange respectively of the compressed beam.

2. The device according to claim 1, comprising a plurality of nozzles through which metered strands pass, making possible the production of a strand bead of predetermined cross-section.

3. The device according to claim 1, the receiving surface being movable and disposed to be moved to the press, and the receiving surface comprising doors which can be opened so rapidly that the strands which are carried by the receiving surface can be transferred to the press substantially maintaining the cross-section of the strand bead.

4. The device according to claim 1, the metering device comprising a scale for assuring the correct metering of strands.

5. The device according to claim 1, the metering device comprising a plurality of adjustable deflection baffles, which extend out from the walls of the metering device.

6. The device according to claim 1, the feeder device comprising a break up device, which is adapted to break up lumped strands.

7. The device according to claim 6, the break up device being a pulsating impact means, which hits from below the strands which, by means of the plunger, have been pushed out of the magazine.

* * * * *